(12) United States Patent
Hummel et al.

(10) Patent No.: US 8,868,672 B2
(45) Date of Patent: Oct. 21, 2014

(54) SERVER NODE INTERCONNECT DEVICES AND METHODS

(75) Inventors: Mark Hummel, Franklin, MA (US); David E. Mayhew, Northborough, MA (US); Michael J. Osborn, Hollis, NH (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 13/470,847

(22) Filed: May 14, 2012

(65) Prior Publication Data

US 2013/0304841 A1    Nov. 14, 2013

(51) Int. Cl.
*G06F 15/167*    (2006.01)

(52) U.S. Cl.
USPC .......................................... 709/212; 709/216

(58) Field of Classification Search
USPC .................................. 709/212, 216
See application file for complete search history.

(56) References Cited

U.S. PATENT DOCUMENTS

| | | | |
|---|---|---|---|
| 6,785,892 B1 | 8/2004 | Miller et al. | |
| 6,795,886 B1 | 9/2004 | Nguyen | |
| 6,850,987 B1 | 2/2005 | McCanne et al. | |
| 7,421,532 B2* | 9/2008 | Stewart et al. | 710/315 |
| 7,480,303 B1* | 1/2009 | Ngai | 370/395.5 |
| 7,814,259 B2* | 10/2010 | Stewart et al. | 710/315 |
| 7,913,019 B2* | 3/2011 | Inagawa et al. | 710/301 |
| 7,913,027 B2* | 3/2011 | Kloeppner et al. | 710/316 |
| 7,925,802 B2 | 4/2011 | Lauterbach et al. | |
| 2002/0069318 A1 | 6/2002 | Chow et al. | |
| 2002/0087751 A1 | 7/2002 | Chong | |
| 2003/0123468 A1 | 7/2003 | Nong | |
| 2005/0117578 A1* | 6/2005 | Stewart et al. | 370/389 |
| 2006/0282547 A1 | 12/2006 | Hasha et al. | |
| 2007/0162572 A1* | 7/2007 | Aloni et al. | 709/219 |
| 2007/0283128 A1* | 12/2007 | Hoshaku | 712/1 |
| 2008/0005624 A1 | 1/2008 | Kakivaya et al. | |
| 2008/0028467 A1 | 1/2008 | Kommareddy et al. | |
| 2008/0320181 A1 | 12/2008 | Lauterbach et al. | |
| 2009/0070405 A1* | 3/2009 | Mazzaferri | 709/202 |
| 2009/0216920 A1 | 8/2009 | Lauterbach et al. | |
| 2010/0172172 A1 | 7/2010 | Kim et al. | |
| 2010/0272117 A1 | 10/2010 | Wu et al. | |
| 2011/0072204 A1* | 3/2011 | Chang et al. | 711/103 |
| 2011/0103245 A1* | 5/2011 | Lu | 370/252 |

(Continued)

FOREIGN PATENT DOCUMENTS

EP    0581486    9/1994

OTHER PUBLICATIONS

International Search Report & Written Opinion in related international patent application No. PCT/US13/44278, mailed on Sep. 19, 2013; 11 pages.

(Continued)

*Primary Examiner* — Ebrahim Golabbakhsh
(74) *Attorney, Agent, or Firm* — Schmeiser, Olsen & Watts LLP

(57) ABSTRACT

Described are systems and methods for interconnecting devices. A switch fabric is in communication with a plurality of electronic devices. A rendezvous memory is in communication with the switch fabric. Data is transferred to the rendezvous memory from a first electronic device of the plurality of electronic devices in response to a determination that the data is ready for output from a memory at the first electronic device and in response to a location allocated in the rendezvous memory for the data.

24 Claims, 9 Drawing Sheets

(56) References Cited

U.S. PATENT DOCUMENTS

2011/0202701 A1* 8/2011 Maitra ............... 710/308
2012/0243542 A1* 9/2012 Sugumar et al. ............... 370/392

OTHER PUBLICATIONS

Loi, et al., "A Low-overhead Fault Tolerance Scheme for TSV-based 3D Network on Chip Links", IEEE International Conference on Computer-Aided Design, Nov. 10, 2008, New Jersey, USA; 5 pages.

International Search Report & Written Opinion in related international patent application No. PCT/US13/44902, mailed on Oct. 14, 2013; 11 pages.

Non-Final Office Action in related U.S. Appl. No. 13/529,452, mailed on Dec. 17, 2013; 20 pages.

International Search Report and Written Opinion in Related International Patent Application No. PCT/US13/40508, mailed Jul. 29, 2013; 14 pages.

* cited by examiner

SERVER NODE INTERCONNECT DEVICES AND METHODS

FIELD OF THE INVENTION

The present invention relates generally to a network switch architecture, and more specifically, to systems and methods for interconnecting server nodes using a switch fabric.

BACKGROUND

Data centers are generally centralized facilities that provide Internet and intranet services supporting businesses and organizations. A typical data center can house various types of electronic equipment, such as computers, servers (e.g., email servers, proxy servers, and DNS servers), network switches, routers, data storage devices, and other associated components. A given data center can have hundreds or thousands of interconnected server nodes communicating with each other and external devices via a switching architecture comprising the switches and routers. Conventional data centers can also be configured for virtualization, permitting the server nodes to share network interface cards (NICs), hard disk drives, or other hardware. In doing so, a complex switch fabric is required for facilitating communications between nodes via the data center architecture.

BRIEF SUMMARY OF EMBODIMENTS

In accordance with one aspect, there is provided an aggregation device comprising a switch fabric and a rendezvous memory. The switch fabric is in communication with a plurality of electronic devices. The rendezvous memory is in communication with the switch fabric. Data is transferred to the rendezvous memory from a first electronic device of the plurality of electronic devices in response to a determination that the data is ready for output from a memory at the first electronic device and in response to a location allocated in the rendezvous memory for the data.

In accordance with another aspect, there is provided a server aggregation system comprising a plurality of server nodes and an aggregation device coupled to the plurality of server nodes. The aggregation device includes a rendezvous memory that participates in a data transfer with a local memory of a first server node of the plurality of server nodes in response to a determination that the data is ready for output from the memory of a first server node and in response to a location allocated in the rendezvous memory for the data.

In accordance with another aspect, there is provided a method for communication between a plurality of electronic devices and an aggregation system. The method comprises providing data at a local memory of a first electronic device of the plurality of electronic devices for sending to a second electronic device of the plurality of electronic devices, providing a rendezvous memory at the aggregation system for receiving the data from the local memory of the first electronic device, and transferring the data from the local memory of the first electronic device to the rendezvous memory in response to determining by the aggregation system that the data is in the local memory of the first electronic device for transmission and in response to determining that a location is allocated in the rendezvous memory for storing the data received from the local memory of the first electronic device.

In accordance with another aspect, there is provided a method for communication between a plurality of electronic devices and an aggregation system. The method comprises providing data at a local memory of a first electronic device of the plurality of electronic devices for sending to a second electronic device of the plurality of electronic devices; notifying a virtual network interface card (vNIC) at the aggregation system that the data is available at the local memory of the first electronic device for transmission; generating a notification of at least one available buffer at the second electronic device; allocating the at least one available buffer for receiving the data; outputting by the vNIC the data to the at least one available buffer at the second electronic device; and transferring the data from the local memory of the first electronic device to the rendezvous memory in response to a determination that the data is in the local memory of the first electronic device for transmission and in response to determining the allocation of the at least one available buffer at the second electronic device.

In accordance with another aspect, there is provided a computer program product comprising a computer readable storage medium having computer readable program code embodied therewith. The computer readable program code comprises computer readable program code configured to provide data at a local memory of a first electronic device for sending to a second electronic device via an aggregation system; computer readable program code configured to notify a virtual network interface card (vNIC) at the aggregation system that the data is available at the local memory of the first electronic device for transmission; computer readable program code configured to generate a notification of at least one available buffer at the second electronic device; computer readable program code configured to allocate the at least one available buffer for receiving the data; computer readable program code configured to output by the vNIC the data to the at least one available buffer at the second electronic device; and computer readable program code configured to transfer the data from the local memory of the first electronic device to the rendezvous memory in response to a determination that the data is in the local memory of the first electronic device for transmission and in response to determining the allocation of the at least one available buffer at the second electronic device.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION OF PREFERRED EMBODIMENTS

In the following description, specific details are set forth although it should be appreciated by one of ordinary skill that the systems and methods can be practiced without at least some of the details. In some instances, known features or processes are not described in detail so as not to obscure the present invention.

Figure 1:
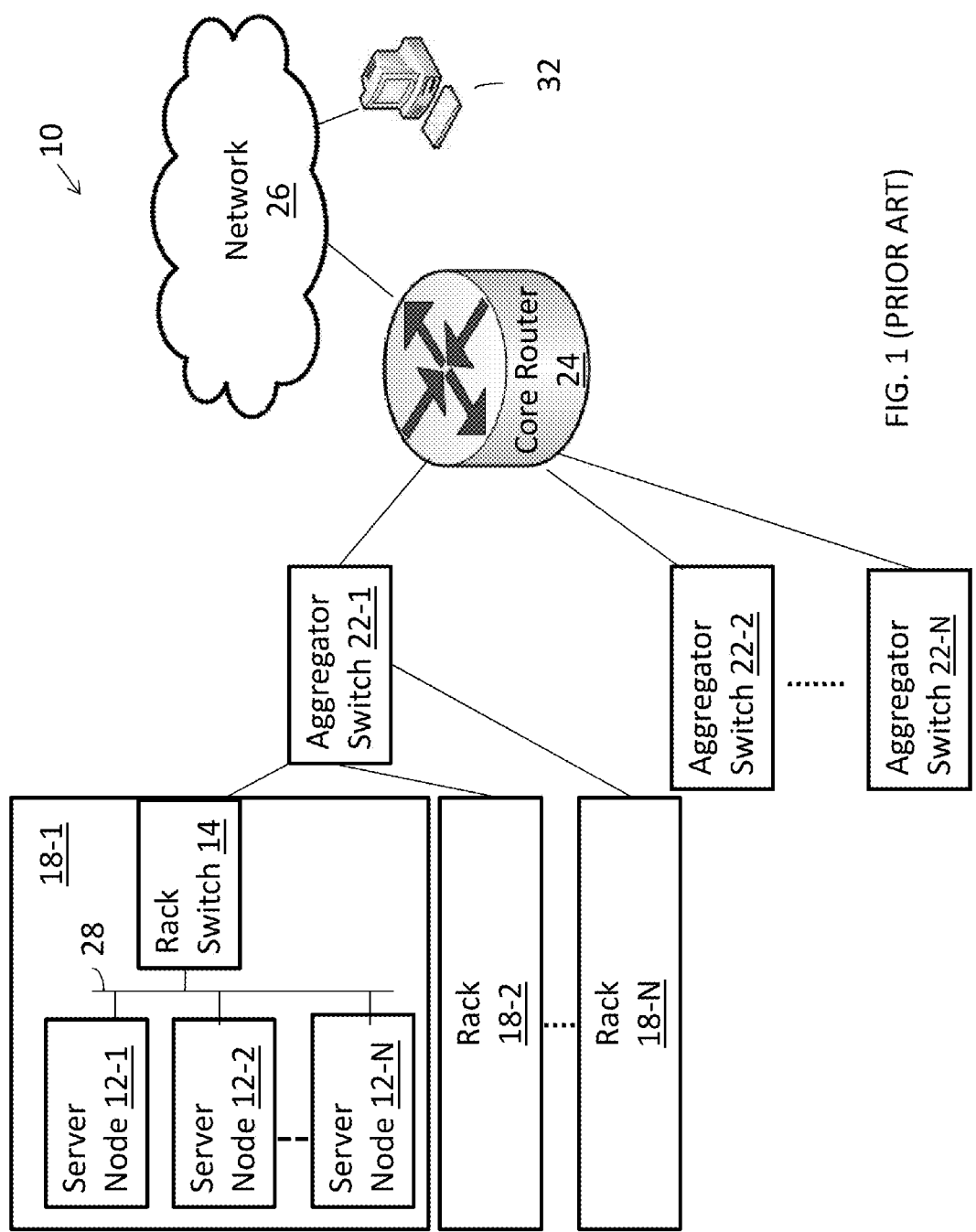
FIG. 1 is a block diagram of a conventional data center network hierarchy.

FIG. 1 is a block diagram of a conventional data center network hierarchy 10. In FIG. 1, a plurality of server nodes 12-1 to 12-N (N is an integer greater than 1) can communicate with a rack switch 14 via a local area network (LAN) such as an Ethernet LAN or related data network in a rack 18-1. The rack 18-1 can be configured as part of a cluster with one or more other racks 18-2, 18-N (N is an integer greater than 1) in the data center network hierarchy 10. Each cluster can include an aggregation switch 22-1, 22-2, 22-N (N is an integer greater than 1), which is connected to a core router 24 via Ethernet or other network connection. A user computer 32, for example, a laptop, smartphone, or other electronic device, can communicate with the server nodes 12-1 to 12-N (generally, 12) via a network 26, for example, an IP network, the internet, and so on. A continuing desire exists to reduce the size, expense, and power requirements associated with data center switches while also increasing data center scalability.

Figure 2:
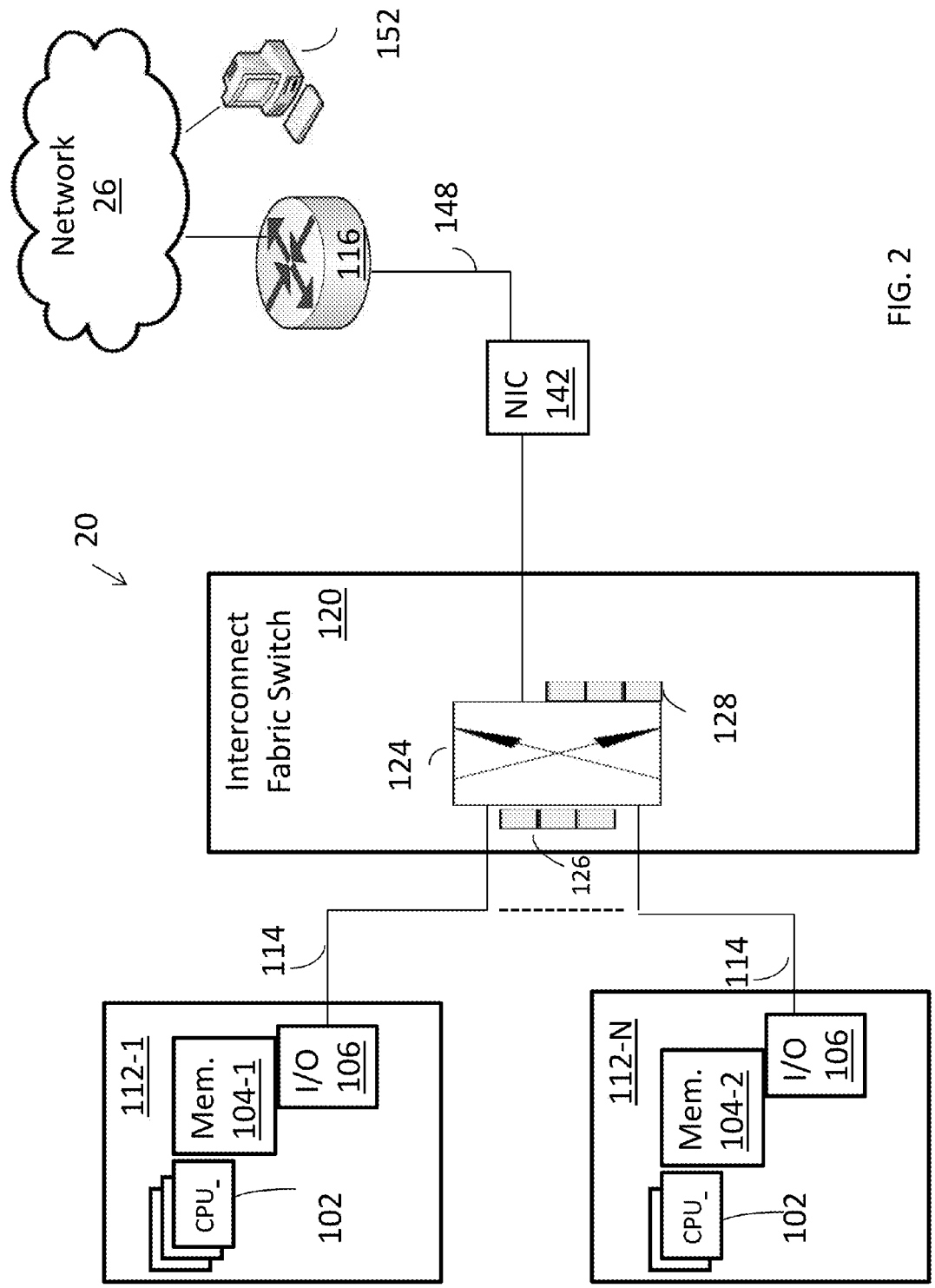
FIG. 2 is a block diagram of a data center including a plurality of server nodes coupled to a conventional interconnect fabric switch.

FIG. 2 is a block diagram of a data center 20 including a plurality of server nodes 112_1 through 112_N (N is an integer greater than 1) coupled to a conventional interconnect fabric switch 120. The interconnect fabric switch 120 can reduce the number of switches by consolidating functions of the aggregation switches and rack switches under a single chassis, replacing much of the traditional Ethernet switching requirements used in conventional server racks.

The server nodes 112_1 through 112_N (generally, 112) can be configured as a processor cluster or other well-known arrangement. The server nodes 112 can include single socket servers or low-power processors 102 having a shared infrastructure. A server node processor 102 can include one or more microprocessors, central processing units (CPUs), graphics processing units (GPUs), digital signal processors (DSPs), application-specific integrated circuits (ASICs), memory controllers, multi-core processors, and other types of data processing devices, as well as portions and/or combinations of these and other devices.

A server node 112 also includes a local memory 104 and an I/O logic 106. The local memory 104 can include non-volatile or volatile memory, for example, one or more channels of dynamic random access memory (DRAM) or static RAM (SRAM). The I/O logic 106 can be configured to include an I/O controller that include a southbridge and the like for managing computer I/O functions, for example, data transfers between the server node 112 and the interconnect fabric switch 120. The I/O logic 106 can include an Ethernet, PCIe, or other network connector 114 for establishing an electronic communication with the interconnect fabric switch 120.

The interconnect fabric switch 120 includes a plurality of input and output ports and a crossbar 124 that can route variable or fixed length frames, data packets, cells, and the like between the input and output ports, facilitating communication between the server nodes 112, shared devices such as the NIC 142 or the hard drive 144, and/or external electronic devices, such as the user computer 152. The ports can include virtual ports, physical ports, or a combination thereof. The ports can be configured for unidirectional or bidirectional communications.

The crossbar 124 can be organized into an array of rows and columns. During data transmission, several input ports on a given row can compete for an output port at a column. The input ports can communicate with an input buffer 126 that temporarily stores data received from the server nodes 112 until the crossbar 124 can deliver the data to an available output port. The output ports can include an output buffer 128 for temporarily storing data received from one or more input ports until the desired output port is available for transmitting the packet to its destination via a network bus 140, for example, an Ethernet bus, a PCIe bus, and the like.

However, the interconnect fabric switch 120 is prone to congestion-related problems such as head-of-line (HOL) blocking, which can occur when multiple input ports of the switch 120 contend for the same output port. Scaling-related issues can also occur, since the addition of I/O ports at the switch 120 increases the risk of contention for shared resources. A related issue is the inefficient use of bandwidth between the server nodes 112 and the interconnect fabric switch 120. For example, HOL blocking can consume a significant amount of bandwidth at the crossbar 124, in particular, if packets, cells, and the like waiting at the input ports are stored in a first-in, first-out (FIFO) queue. Also, queues at the input and output buffers 126, 128 can fill up quickly, resulting in undesirable latency, jitter, or packet loss, as well as overrun and/or underrun conditions, which can lead to inefficient bandwidth utilization and performance issues.

Flow control techniques are readily available for mitigating network congestion at the data center 20. For example, complex scheduling techniques can be applied to manage the data traffic through the crossbar 124. However, such techniques are typically expensive to implement.

Another well-known technique is to implement Ethernet-based retransmissions. However, Ethernet-based retransmissions consume valuable bandwidth.

Other flow control mechanisms can be applied to an upstream device, requesting it to stop passing packets. Although such approaches are effective at reducing buffer overflow, but it does not alleviate network congestion completely.

Another approach is to rely on external memory devices for the temporary storage and queuing of packets. However, this approach requires additional pins at the interconnect fabric switch 120 and "wires" or connectors to an out-of-box memory device, resulting in scaling limitations and bandwidth-related problems along with a corresponding need for additional power consumption.

The present inventive concepts reduce or eliminate congestion-related issues associated with conventional data center interconnect switches by introducing a server aggregation system including a rendezvous device that communicates with the local memories of a plurality of server nodes or related electronic devices via a high-bandwidth switch fabric in a controlled manner. The rendezvous device communicates between a transmitting device having data ready for output and a receiving device having memory buffers available for receiving the data, providing an efficient data transmission path between the transmitting and receiving devices. For example, data can be explicitly transferred from a local memory of a transmitting device after the server aggregation system determines that the data is ready to be output and after a specific memory location is allocated to a memory location at the rendezvous device for storing the data. When both conditions are determined to be true, i.e., the transmitting device has data to send and the receiving device has available buffers, an efficient, low latency data movement occurs from the transmitting device to the receiving device.

In the conventional network switch environment described in FIG. 2, data is output to a crossbar switch queue 126, 128 regardless of whether the queue 126, 128 has available space. If the queue 126, 128 does not have available space, the data is typically discarded, and a complex, bandwidth-consuming retransmission process is implemented.

In an embodiment, a server aggregation system can determine when to receive data from a source server node and the like, and establish a "rendezvous" location, which in turn can communicate with a memory location at a destination server node and the like to provide when to send the data to the destination server node. Pre-allocated locations can be provided at a rendezvous memory and/or the destination server node memory for incoming data from any input port of the server aggregation system. In doing so, free data buffers are allocated in order to move data from the source server node memory to the rendezvous memory, or from the rendezvous memory to a destination server node memory. If there are no available locations in the rendezvous memory for data intended to be sent from a source server node, the data is not transferred to the rendezvous memory until a location is made available in the rendezvous memory. Also, the received data can be stored in the rendezvous memory until the destination server node notifies the server aggregation system that it has an available location in its local memory to receive the data.

In another embodiment, a remote computer provides data to the server aggregation system over an external network to a NIC or related interface coupled between the external network and the server aggregation system. Here, the NIC transfers the data to a receive buffer at the rendezvous memory, for example, identified by descriptors at the NIC's receive ring. If insufficient buffering is available, the data is dropped or filtered. Otherwise, a receive buffer is available, wherein the data is provided to the rendezvous memory, and a processing complex in communication with the rendezvous memory is notified. The memory buffers are then examined to determine where they should be routed and placed on descriptors in the processing complex connection to the switching fabric. At this point, the data is moved in a similar manner as though it was at an ingress vNIC. Here, a rendezvous memory manager is notified by the destination server node, for example, via a vNIC, whether there is an available location at the destination server node memory. The rendezvous memory manager does not fetch the data for transmission to the destination server node memory unless it is allocated a receive buffer.

Accordingly, a feature of the present inventive concepts is that flow control can occur at the input and/or output regions of the rendezvous memory in a data transfer, i.e., at one end of the rendezvous memory communicating with the source server node, and at another end of the rendezvous memory communicating with the destination server node. Also, processing latency from an ingress port to egress port of the switch fabric is low because there is little or no buffering performed at the switch fabric. For example, latency can be improved because a data transaction is scheduled to reduce the risk of blocking due to congestion or other traffic caused by speculative data movement.

Another feature of the present inventive concepts is that bandwidth can be apportioned efficiently in the server aggregation system and between interconnected server nodes, since the server aggregation system can determine prior to an actual data transfer whether a local memory at a source server node has data to be output, whether the rendezvous memory can receive the data, and/or whether a local memory at a server node in a memory-to-memory exchange of data has sufficient space to receive the data.

Figure 3:
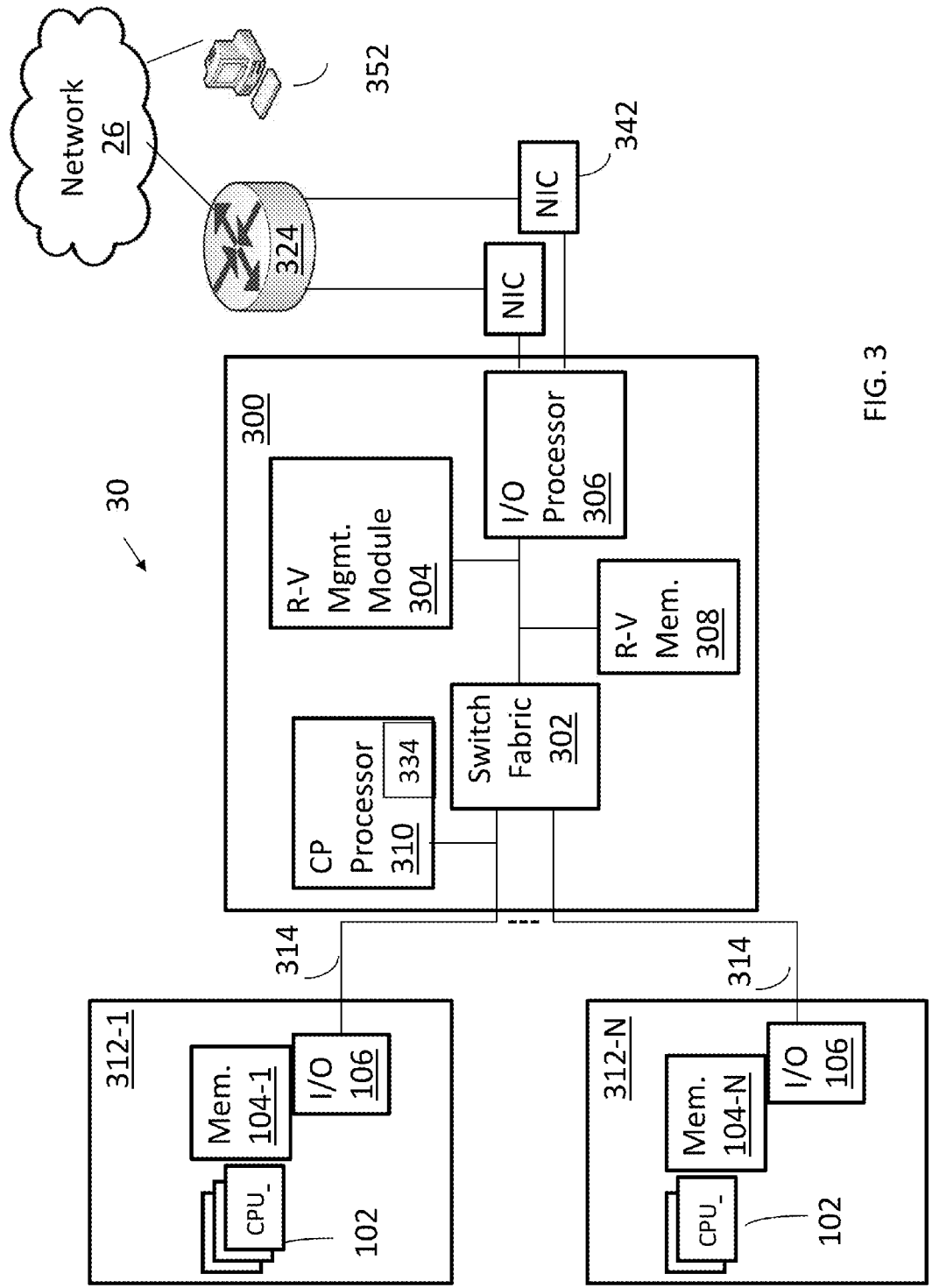
FIG. 3 is a block diagram of a computing infrastructure including a plurality of server nodes in communication with a server aggregation system having a rendezvous memory, in accordance with an embodiment.

FIG. 3 is a block diagram of a computing infrastructure 30 including a plurality of server nodes 312-1 through 312-N in communication with a server aggregation system 300 having a rendezvous memory 308, in accordance with an embodiment. The computing infrastructure 30 can include a large-scale data center, cloud, and the like. The computing infrastructure can be configured for virtualization similar to the data center 20 described with reference to FIG. 2. Details regarding virtualization-related elements are therefore omitted with respect to FIG. 3 for reasons of brevity.

The server aggregation system 300 includes a switch fabric 302, a rendezvous management module 304, an I/O processor 306, a rendezvous memory 308, and a control plane processor 110. The server aggregation system 300 can be configured for virtualization.

The server nodes 312-1 through 312-N (generally, 312), or microservers and/or other electronic devices having at least one processor, can communicate with the server aggregation system 300 via a connector 314, preferably a PCIe bus or other network connector. Each connector 314 can provide a data path between one or more server nodes 312 and the server aggregation system 300. The server aggregation system 300 and the server nodes 312 can be co-located at a same multi-processing unit, for example, a chip, a computing device, or a rack. In other embodiments, the server nodes 312 are fabricated on one or more units, and the server aggregation system 300 is fabricated on a separate unit, for example, a chip.

The switch fabric 302 includes a plurality of input ports and output ports, and can be configured to move data or other electronic information between the server nodes 312 in communication with its input ports and the rendezvous memory 308 in communication with its egress ports. The switch fabric 302 can include a switching configuration, for example, a crossbar, for moving data between its ingress ports and egress ports, as is well-known to those of ordinary skill in the art. Unlike conventional switch fabrics, little or no buffering is required at the switch fabric 302, since conventional queuing techniques are not required at the switch fabric. The switch fabric 302 and the rendezvous memory 308 can be interconnected having a I/O bandwidth communication channel therebetween and is therefore capable of receiving data from any number of server nodes 312, providing that the rendezvous memory 308 has allocated enough space for the data.

The rendezvous management module 304 in collaboration with the control plane processor 310 and the I/O processor 306 oversees the explicit transfer of data packets between one or more memories 104-1 through 104-N (generally, 104) at the server nodes 312 and the rendezvous memory 308. The rendezvous management module 304 can allocate buffer space in the rendezvous memory 308 for "parking" data sent from a source server node until a destination server node or external computing device can retrieve it from the rendezvous memory 308. The rendezvous management module 304 can use descriptors and the like to control the manner in which data is transmitted from the rendezvous memory 308 to a destination memory. The rendezvous management module 304 can monitor receive buffer availability at the rendezvous memory 308 and wait for receive buffers to be posted. In other words, the rendezvous management module 304 can ensure that one party in a transfer operation, i.e., a source server node or the rendezvous memory, has data for transmission and that the other party in the transfer operation, i.e., a destination server or the rendezvous memory, has sufficient space to receive the data.

The rendezvous memory 308 can include through via silicon (TSV), SRAM, or on-die memory configured for sufficient high bandwidth, for example, 10 Gb or more, when communicating with a plurality of network switch links. The rendezvous memory 308 can be configured to include a plurality of free data buffers, for example, organized into blocks of memory, that can be allocated to one or more vNICs 334 when moving data from a local memory 104 to the rendezvous memory 308.

The I/O processor 306 processes data transferred between the rendezvous memory 308 and one or more electronic devices, for example, the server nodes 312 and/or remote computing devices 352. The I/O processor 306 can include a multiplexer and other logic for performing data transfers to and from the rendezvous memory 308 in accordance with communications made with the rendezvous management module 304, the control plane processor 310, or a combination thereof. In this manner, the I/O processor 306 can serve as a staging area for moving data into and out of the server aggregation system 300, for example, between two or more server nodes 312 or between a server node 312 and the external computing device 352.

The I/O processor 306 can identify buffers in the rendezvous memory 308 where specific data determined to be ready for transmission from a source server node 312 is to be temporarily stored, for example, until a destination server node 312 retrieves the data, by posting receive descriptors that point to the available buffers. The I/O processor 306 can maintain buffer descriptors, for example, for one or more channels of the rendezvous memory 308, for moving data from the rendezvous memory 308 to a vNIC 334, which can process the buffer descriptors. The I/O processor 306 can populate receive descriptors with receive buffer resources.

The control plane processor 310 manages a switching control plane (not shown) for data delivery between the server nodes 312 and the server aggregation system 300 by operating network routing protocols, participating in the forwarding of data packets, frames, cells, and the like that are received by the server aggregation system 300, and so on. Other control plane processor 310 functions include generating data ready notifications, receive buffer available notifications, buffer releases, and the like. The control plan processor 310 can provide communications between blocks, ports and nodes at the server aggregation system 300 and communicates with the switch fabric 302 for data movement between ports. The control plane processor 310 can write to and/or read from the rendezvous memory 308 and/or one or more server node memories 104. The control plane can be configured to send data available, e.g., ready to send messages, for querying the number of receive buffers available and buffer release messages.

The control plane processor 310 can implement and manage zero, one, or a plurality of vNICs 334, preferably in combination with a direct memory access (DMA) agent (not shown) or related agent in the switch fabric 302. Various types of communication can occur over the control plane under the management of the control plane processor 310, for example, transmit/receive descriptor door bell notifications, written from a server node interface driver to indicate a change in the state of buffer descriptor memory locations. In another example, the control plane can manage buffer release messages, for example, buffers that have been transmitted to be recycled for more transmissions or as receive buffers. Other control plane functions can include providing data ready notifications, receiving buffer available notifications and buffer releases, and the like.

Figure 4:
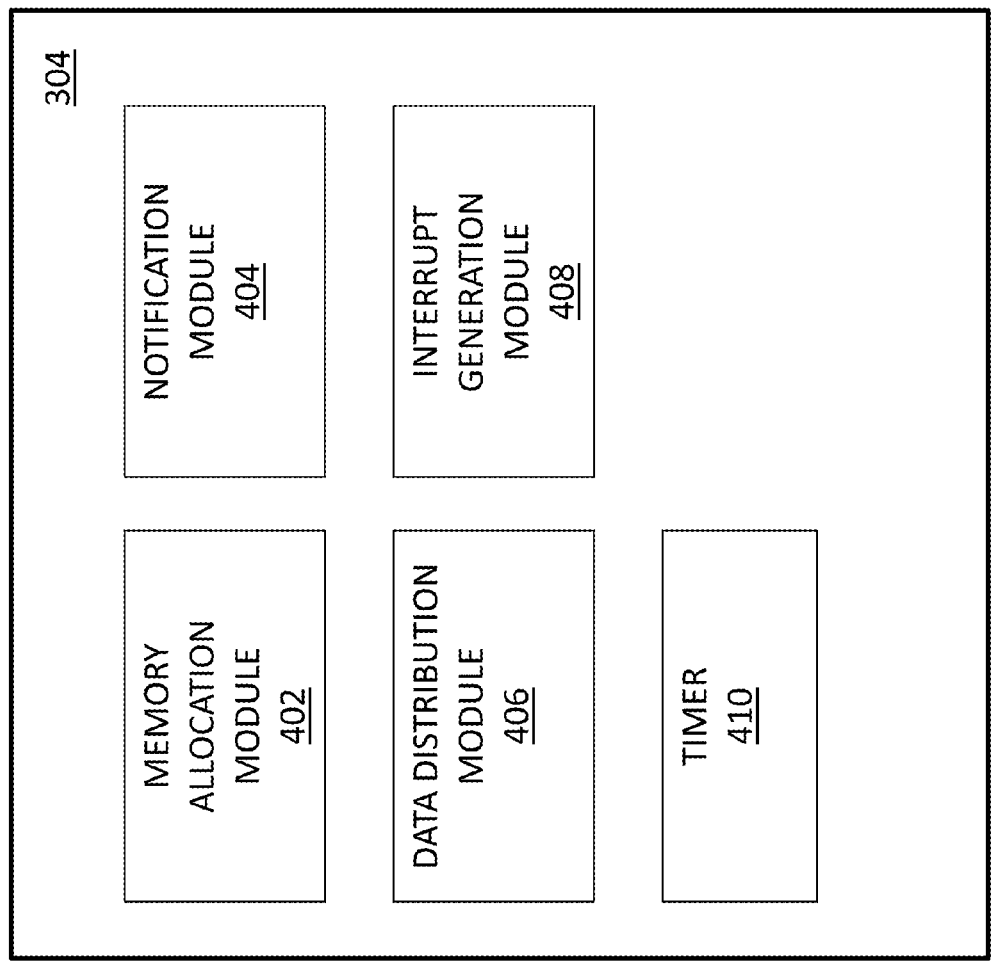
FIG. 4 is a block diagram of the rendezvous manager of FIG. 3, in accordance with an embodiment.

FIG. 4 is a block diagram of the rendezvous management module 304 of FIG. 3, in accordance with an embodiment. The rendezvous management module 304 can include a memory allocation module 402, a notification module 404, a data distribution module 406, an interrupt generation module 408, and/or a timer 410. The rendezvous management module 304 is shown as being part of a same device, such as a chip, rack, and the like. Alternatively, some elements of the rendezvous management module 304 can be physically located elsewhere in the computing infrastructure 30 shown at FIG. 3.

The memory allocation module 402 allocates buffer space in the rendezvous memory 308 for the vNIC 334 to use when fetching data from a source server node 312-1. More specifically, the memory allocation module 402 can provide indices pointing to a block in the rendezvous memory 308 that contain buffer descriptors that point to available data buffer blocks at the rendezvous memory.

The notification module 404 generates a notification regarding buffer allocations when data is input to the rendezvous memory 308. For example, the notification module 404 can notify the vNIC 334 of receive buffer allocations in response to the vNIC 334 requesting buffers. The notification module 404 can receive a notification, for example, from the vNIC 334, indicating that data is available for transmission from a server node 312. The notification module 404 can notify the vNIC 334 that new data is available after fetching descriptors and/or data from the rendezvous memory 308 to the vNIC 334 for a destination device.

The data distribution module 406 can fetch descriptors, data, and the like from the rendezvous memory 308 for allocation to the vNIC 334, which in turn can provide the data to a destination local memory.

The interrupt generation module 408 outputs an interrupt signal to the I/O processor 306 when new data is in the rendezvous memory 308, whereby the I/O processor 306 can pull the data from the rendezvous memory and service it. The interrupt generation module 408 can also output an interrupt signal to the network processor after freeing a transmit descriptor, for example, after moving data from the rendezvous memory 308 to a destination local memory 104-N.

The timer 410 can be activated when receive buffers are not available at the rendezvous memory 308 for allocation to the vNIC 334, indicating to elements of the server aggregation system 300 that data cannot be transferred to the rendezvous memory 308, thereby providing a level of flow control.

Figure 5:
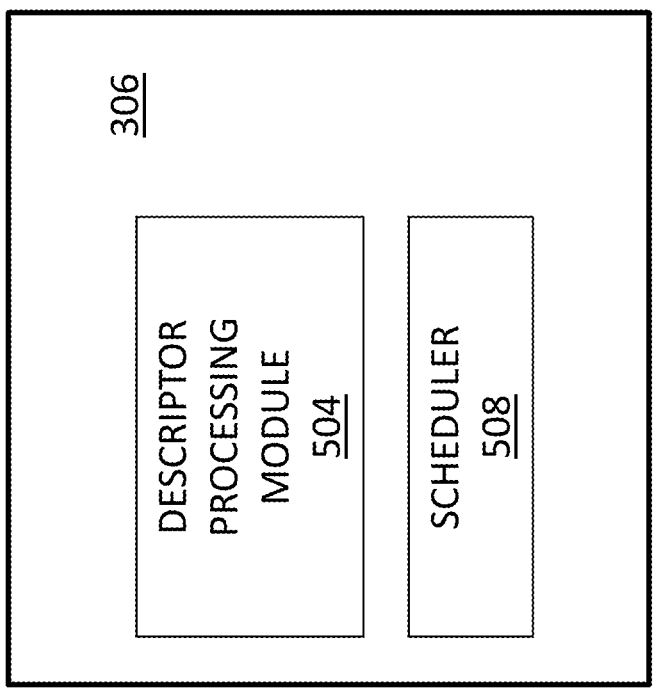
FIG. 5 is a block diagram of the network processor of FIG. 3, in accordance with an embodiment.

FIG. 5 is a block diagram of the I/O processor 306 of FIG. 3, in accordance with an embodiment. The I/O processor 306 includes a processor 502, a descriptor processing module 504, and/or a scheduler 508. The I/O processor can also include a memory (not shown). Although the I/O processor 306 is shown as being part of a common device, such as a chip, rack, and the like, some or all of the elements of the I/O processor 306 can be at other elements of the computing infrastructure 30 shown at FIG. 3.

The processor 502 can execute program code of the programs used for interfacing with elements involved with the outputting of data, for example, NICs 342. The processor 502 can make routing decisions and move receive buffers from a receive descriptor ring to the destination transmit descriptor ring.

The descriptor processing module 504 can generate and/or post receive descriptors that point to available locations at the rendezvous memory 308 for receiving data from a source server node 312-1. The receive descriptors can indicate where in the rendezvous memory 308 a buffer resides, the size of the buffer, a number of segments, and so on. The I/O processor 306 can receive information on which data buffers in the rendezvous memory 308 are available for use by passing descriptors of data buffers are currently free (available to receive data) from the rendezvous memory 308 to the I/O processor 306. The descriptor processing module 504 can also generate transmit descriptors, which can include commands, a scatter-gather list, and the like for transferring the data from the rendezvous memory 308 to a local memory 104-N of a destination server node 312-N.

The scheduler 508 wakes up when it receives a notification that new data is received by the server aggregation system 300, for example, via a NIC 342 or a PCIe connector 314, or that new data is available in the rendezvous memory 308 for transmission to a destination device. The scheduler 508 can coordinate the transfer of data between rendezvous memory and one or more server nodes 312 and/or remote computing devices 352, for example, in a round-robin order, a first-in, first-out order, or other order known to those of ordinary skill in the art. The scheduler can arrange for the transfer of data according to a predetermined policy. For example, a policy can include a mechanism of tagging flows or ports with priority. The I/O processor 306 can perform a level of packet inspection and classification to differentiate flows. A strict priority scheduler 508 can be implemented. Alternatively, the scheduler 508 can provide different flows having a minimal bandwidth allocation. The scheduler 508 can select data for a destination by managing vNICs at the server aggregation system 300.

Figure 6:
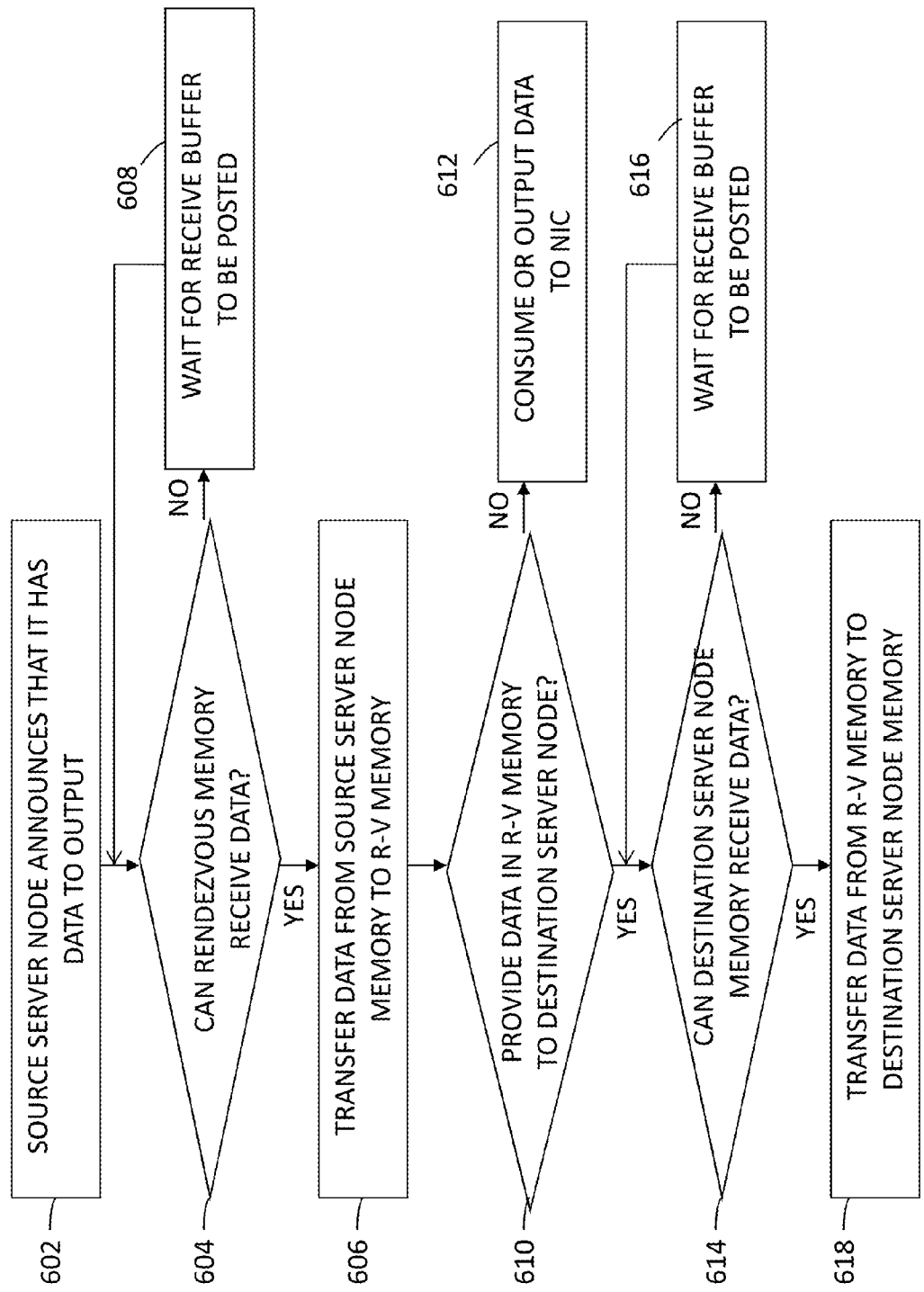
FIG. 6 is a flow diagram of a method for electronic communication between a server node and a server aggregation system having a rendezvous memory, in accordance with an embodiment.

FIG. 6 is a flow diagram of a method 600 for electronic communication between a server node and a server aggregation system having a rendezvous memory, in accordance with an embodiment. The method 600 can be governed by instructions that are stored in a memory 104 of one or more server nodes 312 and/or the server aggregation system 300 of FIG. 3. Accordingly, reference is made to FIGS. 2-5. Some or all of the method 600 can be performed on-die, at an ASIC, a system-on-a-chip (SOC), or related device.

At block 602, a source server node 312-1 announces that a cell, packet, frame or other unit of data in local memory 104-1 is available for output to a destination, for example, another server node 312-N or an external computing device 352 via a NIC 342. The source server node 312-1 can notify the vNIC 334 that data for transmission is in the memory 104-1 and is available for transmission. The server nodes 312 can maintain ring buffers and the like defined in the memory 104-1 for processing the data for performing a data transmit or receive operation.

At decision diamond 604, a determination is made whether the rendezvous memory 308 can receive the data for transmission in the memory 104-1 of the source server node 312-1. The determination can be made by the rendezvous management module 304, which can establish whether buffer space is available in the rendezvous memory 308 where data can be transmitted directly from the source server node 312-1. If the rendezvous memory 308 cannot receive the data, then at block 608, the rendezvous management module 304 can wait for a receive buffer to be posted. Otherwise, at block 606, data, descriptors, and the like can be transferred from the memory 104-1 of the source server node 312-1 to the rendezvous memory 308.

At decision diamond 610, a determination is made by the I/O processor 306 whether the data transferred from the source server node 312-1 to the rendezvous memory 308 is to be forwarded to a destination server node, for example, server node 312-N. The determination can be based on a destination address, or by prepending meta information on a transmit descriptor or packet that identifies a destination port. If the determination result is that data is not to be transferred to the destination server node, then at block 612, the I/O processor 306 can consume the data, for example, the data terminates at the I/O processor 306. Alternatively, the I/O processor 306 can forward the data to a NIC 342 depending on the data contents, for example, based on a destination address. For example, a data packet can be associated with flow management through the switch fabric 302 and interacts with elements of the I/O processor 306 the processing complex that control routing of the data. Otherwise, at decision diamond 614, a determination is made whether the destination server node 312-N has available space in its local memory 104-N to receive the data ready for transmission from the rendezvous memory 308. The determination can be made by the control plane processor 310, where the virtual NIC 334 can establish whether buffer space is available in the destination local memory 104-N. If no, then at block 616 the rendezvous management module 304 can wait to send the data to the destination local memory 104-N until a receive buffer is posted by the destination server node CPU 102. Otherwise, at block 618, when a determination is made that the data is available at the rendezvous memory 308 for transfer, and that a receive buffer is allocated for the rendezvous memory 308, the data can be transferred from the rendezvous memory 308 to the destination server node memory 104-N.

Figure 7:
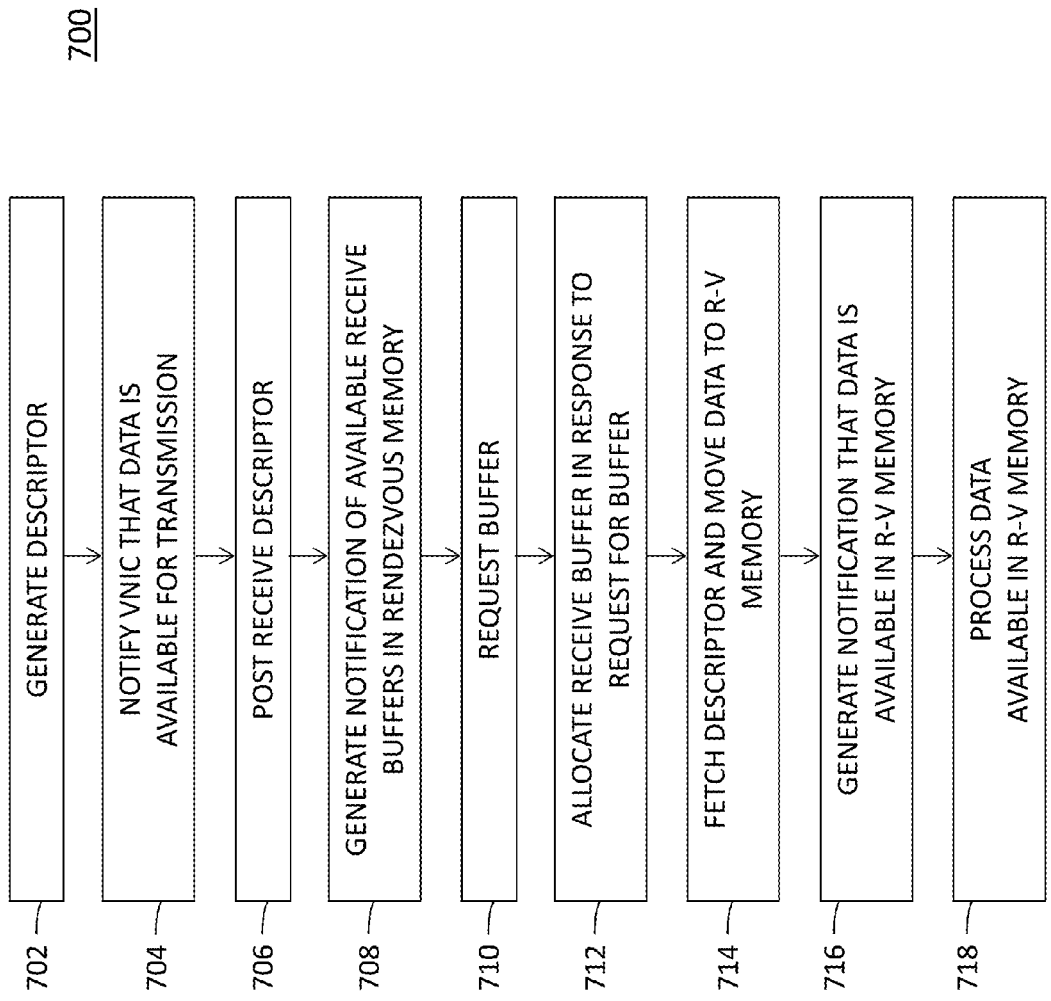
FIG. 7 is a flow diagram of a method for electronic communication between a source server node and a server aggregation system having a rendezvous memory, in accordance with an embodiment.

FIG. 7 is a flow diagram of a method 700 for electronic communication between a server node and a server aggregation system having a rendezvous memory, in accordance with an embodiment. The method 700 can be governed by instructions that are stored in a memory 104 of one or more server nodes 312 and/or the server aggregation system 300 of FIG. 3. Accordingly, reference is made to FIGS. 2-5. Some or all of the method 700 can be performed on die, at an ASIC, a system-on-a-chip (SOC), or a related integrated circuit.

The server node 312-1 first determines that a cell, packet, frame or other unit of data is in local memory 104-1 to be output to a destination, for example, another server node 312-N, or the remote computing device 352 via a NIC 342. The local memory 104-1 can include queues, ring buffers, linked lists, and the like for processing data.

At block 702, the CPU 102 of the server node 312-1 can generate a descriptor or related information regarding the data in the local memory 104-1 to be output from the server node 312-1. The descriptor can include a command, a scatter-gather list, and the like related to the data to be transferred to the rendezvous memory 308. Related descriptor information can identify a location in the memory 104-1 where the data resides, a destination address where the data is to be transmitted, the number of bytes of data to move, and/or other relevant information for establishing a communication between the CPU 102 and a vNIC 334 at the server aggregation system 300.

At block 704, the CPU 102 of the first server node 312-1 notifies the vNIC 334 that a new descriptor is in the memory 104-1 and is available for transmission. The CPU 102 can notify the vNIC 334 of the availability of data for transmission by sending a mailbox write or related event notification to the vNIC 334 via the communication path 314.

At block 706, the I/O processor 306 posts a receive descriptor that points to an available data buffer in the rendezvous memory 308. The receive descriptor can include a buffer address, length, or related information.

At block 708, the I/O processor 306 notifies the rendezvous management module 304 of the availability of one or more rendezvous memory buffers for the vNIC 334.

At block 710, the control plane processor 310 sends a message to the rendezvous management module 304 requesting one or more buffer locations in the rendezvous memory 308 for availability for the vNIC 334.

At block 712, the rendezvous management module 304 allocates for the vNIC 334 one or more receive buffers from the rendezvous memory 308 to allow the vNIC 334 to transfer, copy, or otherwise move data from the server node memory 104-1 to the rendezvous memory 308. The rendezvous management module 304 can send a notification to the control plane processor 310 of the buffer allocation. If no receive buffers are currently available, the rendezvous management module 304 can wait for a receive buffer to become available. Descriptors and/or data are not fetched during this wait period. In an embodiment, input descriptors can be prefetched to reduce latency as they don't consume significant memory resources to reduce transfer latency.

At block 714, the vNIC 334 fetches transmit descriptors from the server node memory 104-1 used for fetching the data. The vNIC 334 can fetch one or more descriptors, or follow a chain of descriptors for fetching. The vNIC 334 fetches the data according to the descriptor information, e.g., an address, from the server node memory 104-1, and moves the data over the switch fabric 302 to the available rendezvous memory 308 allocated by the rendezvous management module 304. For example, the control plane processor 310 can issue a read to the memory 104-1 via a PCIe connector 314 to fetch the data to move to the rendezvous memory 308.

At block 716, the control plane processor 310 can send a notification to the rendezvous management module 304 that the fetched data is available in the rendezvous memory 308. The rendezvous management module 304 can generate an interrupt that is transmitted to the I/O processor 306, whereby the I/O processor 306 can pull the data from the rendezvous memory 308 and service it.

At block 718, the I/O processor 306 can process the data in the rendezvous memory 308, for example, determining whether to consume the data, forward it to a NIC 342, or forward it to a CPU 102 of another server node 312 that is part of the computing infrastructure 30.

Although not shown, the control plane processor 310 can free the transmit descriptor generated at the server node 312-1. The control plane processor 310 can optionally interrupt the server node CPU 102. The I/O processor 306 can control the delivery of the data in the rendezvous memory 308, for example, according to the scheduler 508. In this manner, the I/O processor 306 can assure delivery of the data to its destination, for example, a destination server node 312-N, described in detail in FIG. 8.

Figure 8:
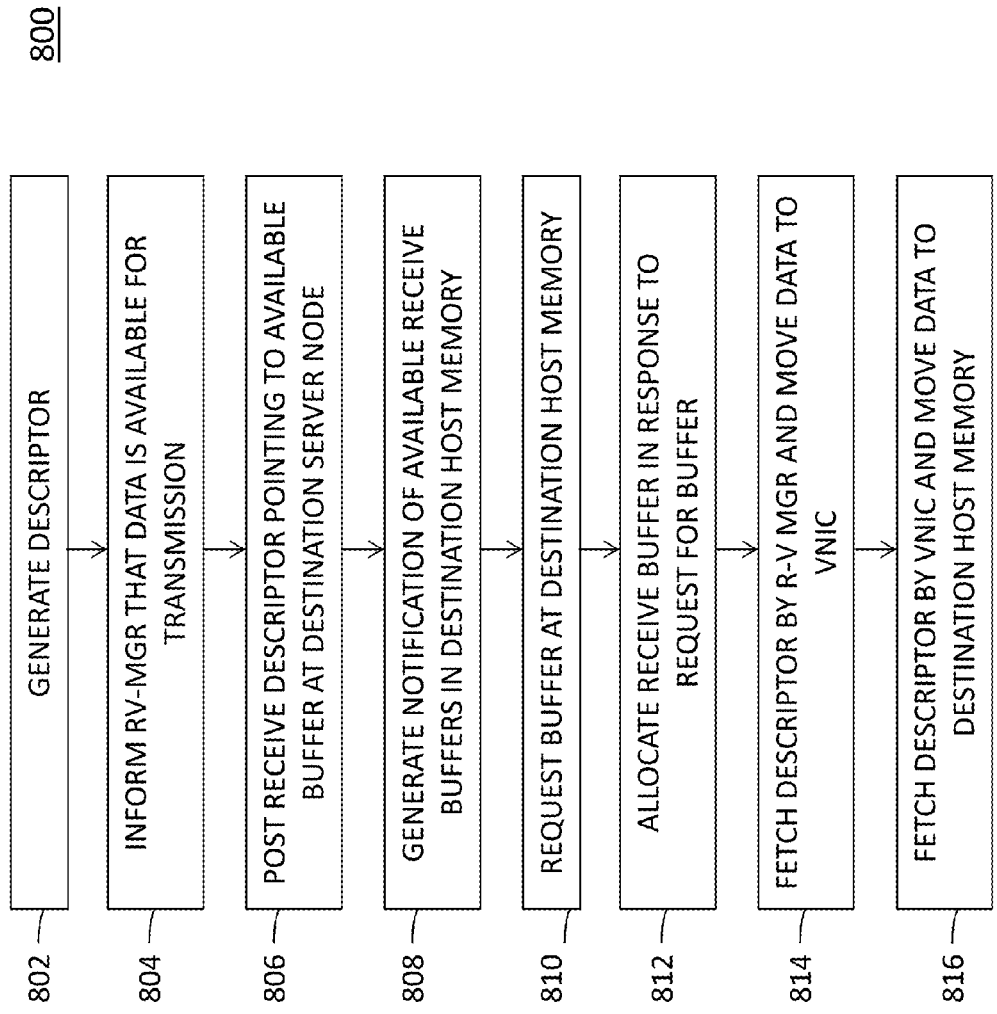
FIG. 8 is a flow diagram of a method for establishing a communication between a server aggregation system and a destination server node, in accordance with an embodiment.

FIG. 8 is a flow diagram of a method 800 for establishing a communication between first and second server nodes coupled to a server aggregation system configured for rendezvous switching, in accordance with an embodiment. The method 800 can be performed in response to a determination at block 718 of FIG. 7 by a network processor of the server aggregation system to forward the fetched data available in the rendezvous memory 308 to another server node or related electronic device having a CPU, for example, server node 312-N shown in FIG. 3. The method 800 can be governed by instructions that are stored in a memory 104 of a server node 312 and/or the server aggregation system 300 of FIG. 3. In doing so, reference is made to FIGS. 2-5 and 7.

At block 802, the descriptor processing module 504 of the I/O processor 306 can provide a descriptor or related information related to the data moved into the rendezvous memory 308 according to the method 700 described in FIG. 7. The descriptor can include a command, a scatter-gather list, and the like for transferring the data to a local memory 104-N of a destination server node 312-N. Related descriptor information can identify a location in the memory 104-1 where the data resides, a destination address where the data is to be transmitted, the number of bytes of data to move, and/or other relevant information for establishing a communication between the I/O processor 306 and the vNIC 334 participating in the transfer of the data to the local memory 104-N.

At block 804, the I/O processor 306 notifies the rendezvous management module 304 that the data in the rendezvous memory 308 is available for transmission.

At block 806, a CPU 102 at the destination server node 312-N posts a receive descriptor that points to an available data buffer in the memory 104-N of the destination server node 312-N. The receive descriptor can include a buffer address, length, or related information.

At block 808, the CPU 102 of the destination server node 312-N notifies the control plane processor 310 of the availability of one or more host memory buffers at the memory 104-N for the rendezvous management module 304.

At block 810, the CPU 102 of the destination server node 312-N sends a request to the control plane processor 310 requesting one or more buffer locations in the destination node memory 104-N for availability to the rendezvous management module 304.

At block 812, the control plane processor 310 allocates for the rendezvous management module 304 a receive buffer from the destination node memory 104-N to allow the rendezvous management module 304 to transfer, copy, etc. data from the rendezvous memory 308 to the destination node memory 104-N. The control plane processor 310 can send a notification to the rendezvous management module 304 of the buffer allocation. If no receive buffers are currently available, the rendezvous management module 304 can wait for a receive buffer to become available at the destination server node memory 104-N. In an embodiment, descriptors and/or data are not fetched during this wait period.

At block 814, the rendezvous management module 304 fetches transmit descriptors used for fetching the data from the rendezvous memory 308. The rendezvous management module 304 fetches the data according to the descriptor information, e.g., an address, from the rendezvous memory 308, and moves the data over the switch fabric 302 to the vnic 634. The rendezvous management module 304 can notify the control plane processor 310 that the new data is available after fetching descriptors and/or data from the rendezvous memory 308 to the vNIC 334 for the destination server node 312-N.

At block 816, the vNIC/CP fetches and processes a descriptor for a receive buffer and moves the data to the destination server node memory 104-N. The control plane processor 310 can generate an interrupt that is output to the CPU 102 of the destination server node 312-N for servicing the data moved to the memory 104-N. The rendezvous management module 304 can free the transmit descriptor and optionally interrupt the server node I/O processor 306.

Embodiments of the methods described herein permit data to be transferred on demand, when the server aggregation system 300 determines that data is ready to be sent to its destination. If the rendezvous memory 308 is not ready to receive data, data is not transmitted to it, even if the data is ready for transfer at the source server node 312-1. Similarly, if the destination server node 312-N is not ready to receive data, data is not transmitted to it from the rendezvous memory 308. In this manner, conventional queuing techniques are not required, and data is not dropped due to lack of buffer space. Instead, the movement of data is tied to the availability of descriptors. When descriptors are established, a determination can be made by the server aggregation system 300 that there is data to move.

Figure 9:
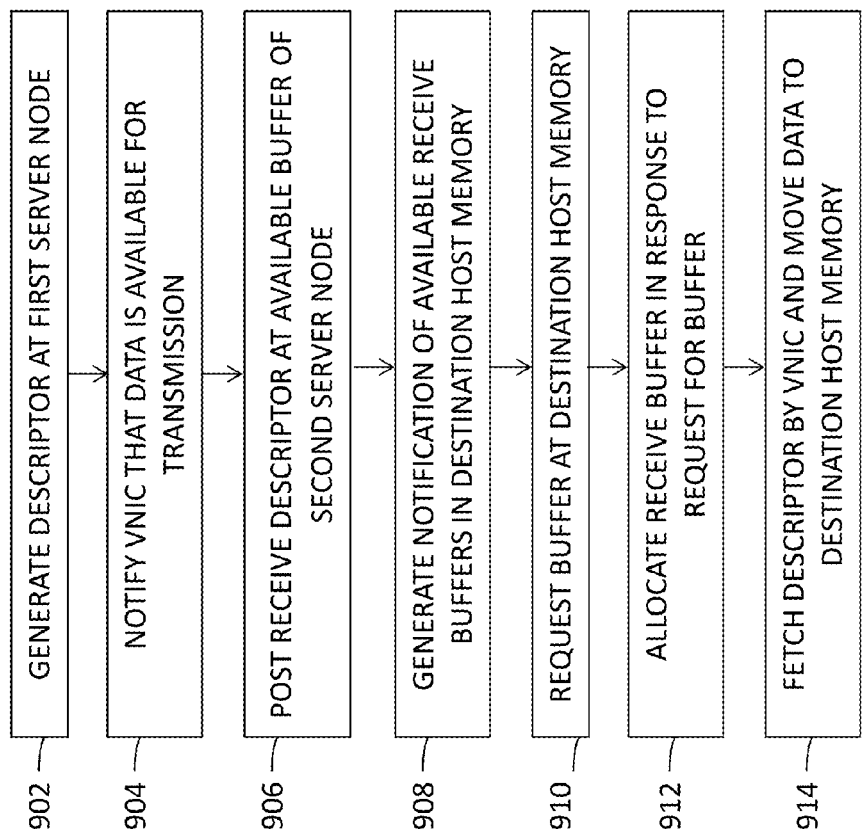
FIG. 9 is a flow diagram of a method for establishing a communication between first and second server nodes coupled to a server aggregation system configured for rendezvous switching, in accordance with another embodiment.

FIG. 9 is a flow diagram of a method 900 for electronic communication between first and second server nodes coupled to a server aggregation system configured for rendezvous switching, in accordance with an embodiment. The method 900 can be governed by instructions that are stored in a memory 104 of one or more server nodes 312 and/or the server aggregation system 300 described above. One or more elements of the method 900 can be similar to those described above. Although reference is made to FIGS. 2-5, the method 900 is performed with the absence of a rendezvous memory 308. In particular, the rendezvous management module 304 and the control plane processor 310 can participate in the method 900, in which a data transfer occurs between two server nodes 212-1, 212-N without an intervening rendezvous memory 308.

At block 902, a descriptor is generated at the first server node 312-1.

At block 904, the vNIC 334 is notified that data is available for transmission.

At block 906, a receive descriptor is posted at an available buffer of the second server node 312-N.

At block 908, the destination server node 312-N notifies the control plane processor 310 of the availability of one or more host memory buffers at the memory 104-N for the rendezvous management module 304.

At block 910, a request is made for buffers at the destination node memory 104-N.

At block 912, receive buffers are allocated. The buffers can be allocated for the vNIC 334 to allow the vNIC 334 of the control plane processor 310 to transfer, copy, or otherwise move data from the server node memory 104-1 to the destination node memory 104-N.

At block 914, the vNIC 334 fetches and processes a descriptor for a receive buffer and moves the data to the destination server node memory 104-N.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. An aggregation device, comprising:
   a switch fabric in communication with a plurality of electronic devices;
   a control plane processor that fetches a first transmit descriptor from a memory at a first electronic device, including information corresponding to data ready for output from the memory at the first electronic device, the information including a location of the memory at the first electronic device where the data resides and the size of the data, wherein the control plane processor comprises a virtual network interface card (vNIC), and wherein the vNIC fetches the data from the first electronic device; and
   a rendezvous memory in communication with the switch fabric, wherein the control plane processor transfers the data to the rendezvous memory from the first electronic device of the plurality of electronic devices in response to a determination, using the first transmit descriptor, that the data is ready for output from the memory at the first electronic device and in response to an allocation of a location in the rendezvous memory sufficient to contain the data;
   and wherein a rendezvous management module fetches from the rendezvous memory a second transmit descriptor including information corresponding to the data ready for output from the rendezvous memory, the information including a location of the rendezvous memory where the data resides and the size of the data and moves the data, using the second transmit descriptor, from the rendezvous memory to the second electronic device in response to a determination that the data is ready for output from the rendezvous memory to the second electronic device and in response to a location allocated in a memory at the second electronic device for the data.

2. The aggregation device of claim 1, wherein the first electronic device is a server node coupled to the switch fabric.

3. The aggregation device of claim 1, wherein the first electronic device is a remote computer in communication with the aggregation device.

4. The aggregation device of claim 1, wherein the destination electronic device is a second server node of the plurality of server nodes or a remote computer in communication with the aggregation device.

5. The aggregation device of claim 1, further comprising the rendezvous management module responsible for allocating the location in the rendezvous memory for the data until the data can be provided to a second electronic device.

6. The aggregation device of claim 1, further comprising an input/output (I/O) processor that identifies the location allocated in the rendezvous memory where the data ready for output is to be received.

7. The aggregation device of claim 1, further comprising a control plane processor that manages a switching control plane for data delivery between the plurality of electronic devices.

8. The aggregation device of claim 1, wherein the memory includes a through silicon via (TSV) memory.

9. The aggregation device of claim 1, wherein the rendezvous memory includes an on die memory.

10. A server aggregation system, comprising:
    a plurality of electronic devices; and
    an aggregation device coupled to the plurality of electronic devices, the aggregation device including:
    a control plane processor that fetches a first transmit descriptor from a memory at a first electronic device, including information corresponding to data ready for output from the memory at the first electronic device, the information including a location of the memory at the first electronic device where the data resides and the size of the data, wherein the control plane processor comprises a virtual network interface card (vNIC), and wherein the vNIC fetches the data from the first electronic device; and
    a rendezvous memory that participates in a data transfer with a local memory of a first server node of the plurality of electronic devices and wherein the control plane processor transfers the data to the aggregation device from the first electronic device in response to a determination, using the first transmit descriptor, that the data is ready for output from a memory of a first electronic device and in response to an allocation of a location in the rendezvous memory sufficient to contain the data, wherein a rendezvous management module fetches from the rendezvous memory a second transmit descriptor including information corresponding to the data ready for output from the rendezvous memory, the information including a location of the rendezvous memory where the data resides and the size of the data and moves the data, using the second transmit descriptor, from the rendezvous memory to the second electronic device in response to a determination that the data is ready for output from the rendezvous memory to the second electronic device and in response to a location allocated in a memory at the second electronic device.

11. The server aggregation system of claim 10, wherein the destination electronic device is a second server node of the plurality of server nodes or a remote computer in communication with the aggregation device.

12. The server aggregation system of claim 10, further comprising the rendezvous management module responsible for allocating the location in the rendezvous memory for the data until the data can be provided to a second electronic device.

13. The server aggregation system of claim 10, further comprising an input/output (I/O) processor that identifies the location allocated in the rendezvous memory where the data ready for output is to be received.

14. The server aggregation system of claim 10, further comprising a control plane processor that establishes a transfer of the data between the local memory of the first server node and the rendezvous memory.

15. A method for communication between a plurality of electronic devices and an aggregation system, the method comprising:
providing data at a local memory of a first electronic device of the plurality of electronic devices for sending to a second electronic device of the plurality of electronic devices;
fetching, at a control plane processor, a first transmit descriptor from a memory at a first electronic device, including information corresponding to data ready for output from the memory at the first electronic device, the information including a location of the memory at the first electronic device where the data resides and the size of the data, wherein the control plane processor comprises a virtual network interface card (vNIC), and wherein the vNIC fetches the data from the first electronic device;
providing a rendezvous memory at the aggregation system for receiving the data from the local memory of the first electronic device;
transferring by the control plane process the data from the local memory of the first electronic device to the rendezvous memory in response to determining, using the first transmit descriptor, that the data is in the local memory of the first electronic device for transmission and in response to determining an allocation of a location in the rendezvous memory sufficient to contain the data;
fetching from the rendezvous memory a second transmit descriptor including information corresponding to the data ready for output from the rendezvous memory, the information including a location of the rendezvous memory where the data resides and the size of the data; and
moving the data, using the second transmit descriptor, from the rendezvous memory to the second electronic device in response to a determination that the data is ready for output from the rendezvous memory to the second electronic device and in response to a location allocated in a memory at the second electronic device for the data.

16. The method of claim 15, further comprising:
generating a notification from the first electronic device that the data is available for transmission at the local memory of the first electronic device;
identifying an available buffer at the rendezvous memory;
allocating the available buffer for receiving the data from the local memory of the first electronic device; and
outputting the data from the local memory of the first electronic device to the available buffer at the rendezvous memory.

17. The method of claim 15, further comprising:
determining that a local memory at the second electronic device can receive the data; and
transferring the data from the rendezvous memory to the local memory at the second electronic device.

18. The method of claim 17, further comprising:
generating a notification from the rendezvous memory that the data is available for transmission at the rendezvous memory;
identifying an available buffer at the local memory at the second electronic device;
allocating the available buffer at the local memory at the second electronic device; and
outputting the data from the rendezvous memory to the local memory at the second electronic device.

19. The method of claim 15, wherein at least one of the first and second electronic devices includes a server node.

20. The method of claim 15, wherein the second electronic device is a server node or a remote computer.

21. A method for communication between a plurality of electronic devices and an aggregation system, the method comprising:
fetching, at a control plane processor, a first transmit descriptor from a local memory at a first electronic device, including information corresponding to data ready for output from the local memory at the first electronic device, the information including a location of the local memory at the first electronic device where the data resides and the size of the data, wherein the control plane processor comprises a virtual network interface card (vNIC);
notifying the virtual network interface card (vNIC) at the aggregation system that the data is available at the local memory of the first electronic device for transmission;
generating a notification of at least one available buffer at the second electronic device;
allocating the at least one available buffer for receiving the data;
transferring, by the control plane processor the data from the local memory of the first electronic device to the rendezvous memory in response to a determination, using the first transmit descriptor, that the data is in the local memory of the first electronic device for transmission and in response to determining an allocation of a location in the rendezvous memory sufficient to contain the data; and
fetching from the rendezvous memory a second transmit descriptor including information corresponding to the data ready for output from the rendezvous memory, the information including a location of the rendezvous memory where the data resides and the size of the data; and
moving the data, using the second transmit descriptor, from the rendezvous memory to the second electronic device in response to a determination that the data is ready for output from the rendezvous memory to the second electronic device and in response to a location allocated in the at least one available buffer at the second electronic device for the data.

22. The method of claim 21, wherein at least one of the electronic devices includes a server node.

23. The method of claim 21, wherein the second electronic device is a server node or a remote computer.

24. A computer program product, comprising:
a non-transitory computer readable storage medium having computer readable program code embodied therewith, the computer readable program code comprising:
computer readable program code configured to fetch, at a control plane processor, a first transmit descriptor from a local memory at a first electronic device, including information corresponding to data ready for output from the local memory at the first electronic device, the information including a location of the local memory at the first electronic device where the data resides and the size of the data, wherein the control plane processor comprises a virtual network interface card (vNIC);

computer readable program code configured to notify the virtual network interface card (vNIC) at the aggregation system that the data is available at the local memory of the first electronic device for transmission;

computer readable program code configured to generate a notification of at least one available buffer at the second electronic device;

computer readable program code configured to allocate the at least one available buffer for receiving the data;

computer readable program code configured to transfer, by the control plane processor, the data from the local memory of the first electronic device to the rendezvous memory in response to a determination, using the first transmit descriptor, that the data is in the local memory of the first electronic device for transmission and in response to determining the allocation of the at least one available buffer at the second electronic device; and computer readable program code configured to fetch from the rendezvous memory a second transmit descriptor including information corresponding to the data ready for output from the rendezvous memory, the information including a location of the rendezvous memory where the data resides and the size of the data; and computer readable program code configured to move the data, using the second transmit descriptor, from the rendezvous memory to the second electronic device in response to a determination that the data is ready for output from the rendezvous memory to the second electronic device and in response to a location allocated in a memory at the second electronic device for the data.

* * * * *